United States Patent
Suzuki

(10) Patent No.: US 7,147,351 B2
(45) Date of Patent: Dec. 12, 2006

(54) ILLUMINATION SYSTEM FOR ILLUMINATING AN ELECTRONIC DEVICE WITH MULTICOLORED LIGHT

(75) Inventor: Kensaku Suzuki, Saitama (JP)

(73) Assignee: NEC Corporation, Tokyo (JP)

( * ) Notice: Subject to any disclaimer, the term of this patent is extended or adjusted under 35 U.S.C. 154(b) by 96 days.

(21) Appl. No.: 10/938,676

(22) Filed: Sep. 13, 2004

(65) Prior Publication Data

US 2005/0057933 A1   Mar. 17, 2005

(30) Foreign Application Priority Data

Sep. 11, 2003   (JP) ............................. 2003-319779

(51) Int. Cl.
*F21L 4/02*   (2006.01)
(52) U.S. Cl. ...................... 362/351; 362/109; 362/231; 362/311
(58) Field of Classification Search ................ 362/351, 362/555, 583, 558, 561, 577, 109, 230, 231, 362/235, 277, 285, 311; 340/815.45, 815.65; 455/566
See application file for complete search history.

(56) References Cited

U.S. PATENT DOCUMENTS

| | | |
|---|---|---|
| 1,880,026 A | 9/1932 | Singerman |
| 3,425,146 A | 2/1969 | Winstanley |
| 4,641,446 A | 2/1987 | Jackson |
| 6,720,863 B1 * | 4/2004 | Hull et al. ................. 340/7.51 |

FOREIGN PATENT DOCUMENTS

| | | |
|---|---|---|
| DE | 24 03 564 | 8/1975 |
| DE | 201 02 247 U1 | 6/2001 |
| FR | 2 036 356 | 12/1970 |
| JP | 2001-103141 | 4/2001 |
| JP | 2001-166738 | 6/2001 |
| JP | 2002-281143 | 9/2002 |

\* cited by examiner

*Primary Examiner*—Sharon Payne
(74) *Attorney, Agent, or Firm*—McGinn IP Law Group, PLLC

(57) ABSTRACT

An illumination system including light source elements including at least a first element for emitting a first color light and a second element for emitting a second color light whose color is different from the first color light. A screen receives the projecting light from the first and second color lights from the light source elements, and a plate is placed between the light source elements and the screen, thereby defining first and second areas, wherein the first and second areas have different properties of conducting light from each other. In this system, the first color light is projected through the plate on a first area of the screen and the second color light is projected through the plate on a second area of the screen. Then, the first and second areas overlap with each other.

28 Claims, 16 Drawing Sheets

ILLUMINATION SYSTEM FOR ILLUMINATING AN ELECTRONIC DEVICE WITH MULTICOLORED LIGHT

BACKGROUND OF THE INVENTION

This invention relates to an illumination system for illuminating surface of various kinds of device with colored lights. The lights are cast from the inside of the device to the surface to project an image such as an emblem, symbol, trademark and geometrical pattern on the surface. Particularly, the illumination system is suitably incorporated with a portable electronic device.

Recently, some of portable electronic devices such as a portable telephone terminal, PDA (personal data assistant) and wrist watch have a illumination system for emitting various color lights in response to a predetermined action of the devices.

For example, a illumination system of a portable telephone terminal project an emblem on the surface of the portable telephone terminal when the terminal receives a call, or during the terminal is establishing a connection with another telephone terminal.

A portable telephone terminal 101 shown in FIG. 1 has a foldable housing 102 and is now folded in FIG. 1. On an upper housing 103, an conventional illuminator 104, an auxiliary display device 105 and an antenna 106 is installed. The illuminator 104 emits light to Indicate an arrival of a call or establishment of a connection with another telephone terminal. The sub display device 105 displays information when the foldable housing 102 is folded. The antenna 106 directs incoming and outgoing radio waves.

As shown in FIG. 2, the illuminator 104 includes a light source unit 107 and a screen 108. As shown in FIG. 3, the light source unit 107 includes a red LED 107r, a green LED 107g and a blue LED 107b on a print-circuit plate Lights emitted from the LEDs are cast on the screen 108.

The LEDs blink according to a predetermined blinking pattern in order to cast a single one or a mixture of two or three colors on the screen 109. For example, if the blinking pattern consists of combinations of ON/OFF of the LEDs, then the screen 108 is colored in one of red, green, blue, yellow, cyan, magenta, white and black.

Whichever a single LED or plural LEDs emit, a single color is cast on the screen 108 at one time as shown in FIG. 4. Therefore, the screen 108 cannot be divided into plural areas each of which has a different color from each other. Consequently, it is unable to express on the screen 108 that an object with a color moves on a background with another color.

Related arts are disclosed on Japanese Patent Publication No. 2001-166738, in which a group of LEDs including a red, green and blue LEDs

SUMMARY OF THE INVENTION

This invention provides the following an illumination system and an electronic device with the illumination system.

According to one aspect of the present invention, an illumination system including: light source elements including at least a first element for emitting a first color light and a second element for emitting a second color light whose color is different from the first color light; a screen cast the first and second color lights from the light source elements; and a plate which is placed between the light source elements and the screen, and comprises first areas and second areas, the first and second areas having different properties of conducting light from each other, wherein: the first color light is cast through the plate on a first spot of the screen; the second color light is cast through the plate on a second spot of the screen; and the first and second spots overlap with each other is provided.

The light source elements are for example arranged in line with each other. Alternatively, the light source elements may be arranged in vertexes of a polygon. The light axes of the light source elements are preferably parallel but offset with each other.

The first areas of the plate may be openings opened through the plate. It is preferable that the arrangement of the first and second areas on the plate expresses a design to be cast on the screen.

The plate may be a transparent or translucent plate. In this case, the plate is partially painted with lightproof paint as the second areas. Alternatively, the plate may be an opaque plate with penetrable areas for conducting light In this case, the penetrable areas may be openings opened through the plate, or transparent members fit into the plate.

The light source elements may be dots emitting light. The light source elements may include a red, green and blue light source elements for emitting red, green and blue light, respectively. Instead, the light source elements may include a cyan, magenta and yellow light source elements for emitting cyan, magenta and yellow light, respectively. Further, light emitted from one of the red, green and blue light source elements may be partially mixed with a part of light emitted from the other. Similarly, light emitted from one of the cyan, magenta and yellow light source elements may be partially mixed with a part of light emitted from the other.

Each of the light source elements may blink according to a predetermined blinking pattern. In this case, for example, the blinking pattern is predetermined according to the shape of the first and/or second area and to the arrangement of the first and second areas on the plate. The blinking pattern may be predetermined according to the arrangement of the plate, the light source elements and the screen. The blinking pattern may be predetermined according to the arrangement of the light source elements.

At least one filter member may be placed between the plate and the light source elements or between the plate and the screen.

At least one of the plate and the screen may be detachable from the illumination system. The plate and the screen may be integrated with each other.

The screen is for example a transparent or translucent plate with a diffusion layer on at least one surface of the plate. In this case, the diffusion layer diffuses light from the light source elements. The diffusion layer is preferably a white layer. The diffusion layer may be formed on a part of a surface of the plate. In this case, the diffusion layer and the rest of the surface express a design to be illuminated with the light from the light source elements.

Additionally, according to another aspect of the present invention, an electronic device including the above-mentioned illumination system is provided. One example of the electronic device is a portable communication device. In this case, it is preferable that the illumination system is activated in response to a predetermined operation of the portable communication device.

According to one aspect of this invention, light sources emit colors each of which is different from each other. Part of one of the colors is directly cast on a screen as it has been emitted. Other part of the color is mixed with a singular or plural other colors and then cast on the screen. As a result, gradual color change occurs on the screen and therefore, according to the present invention, decorativeness of a portable electronic device can be improved.

According to another aspect of the present invention, pattern cast on the screen is changed in accordance with emissions from the light sources. The emissions are controlled by inputs to the light sources. Therefore, according to the present invention, temporal response of the cast pattern can be easily made.

According to another aspect of the present invention, spots of a color mixture are cast on the screen. For example, it is assumed that the light sources are red, green and blue light emitting elements each of which is controlled by on/off switching. In this case, when the emitting elements are switched in response to a suitable switching pattern, the spot seems to move around on the screen. This aspect provides visual amusement on the screen.

According to another aspect of the present invention, various sizes of light spots are cast on the screen at the same time to supply perspective on the screen.

These aspects are achieved by a simple structure including a conduit plate between the screen and the light sources, No moving parts are required. Therefore, the present invention can be easily implemented in portable electronic devices, e.g. cellular phone terminals, without disturbing miniaturization, weight saving, low-profiling and lowering the cost of production of the devices.

DESCRIPTION OF THE PREFERRED EMBODIMENTS

Figure 1:
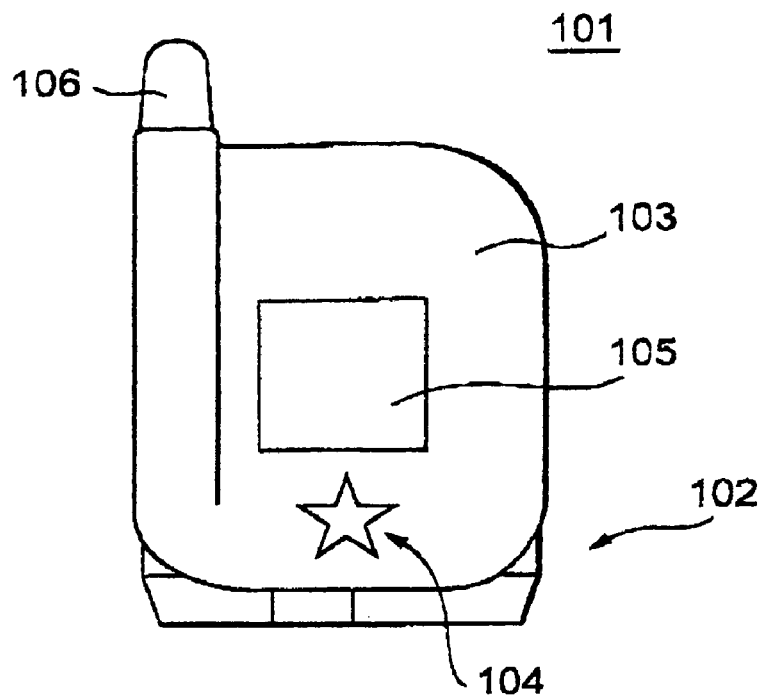
FIG. 1 shows a top view of a folding communication device with an illumination system with being folded.
Figure 2:
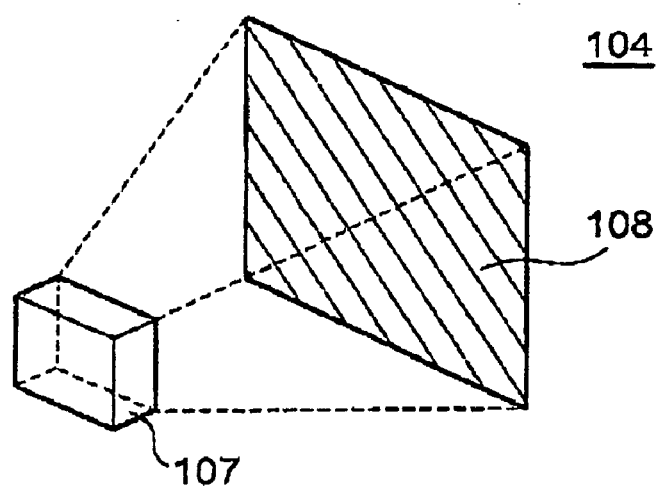
FIG. 2 shows a schematic diagram of a conventional illumination system.
Figure 3:
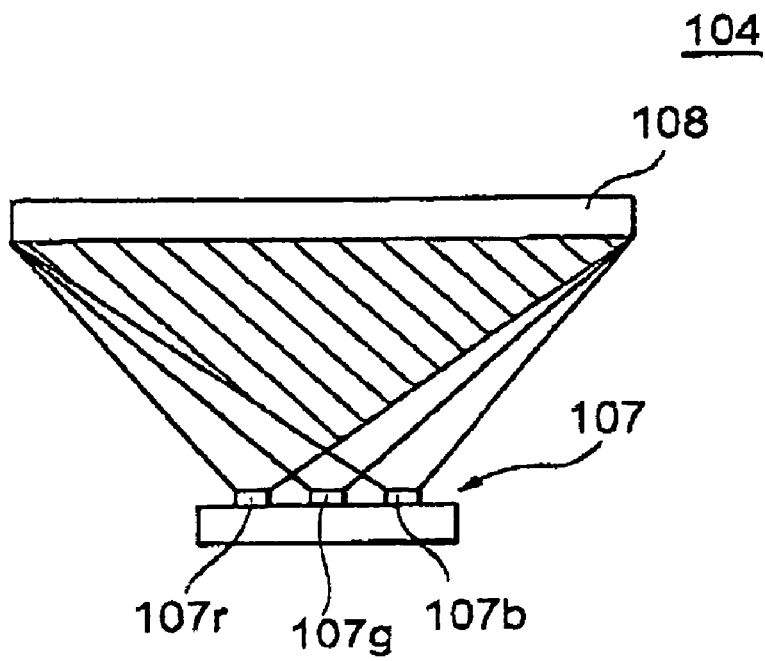
FIG. 3 shows a cross section diagram of the conventional illumination system shown in FIG. 2.
Figure 4:
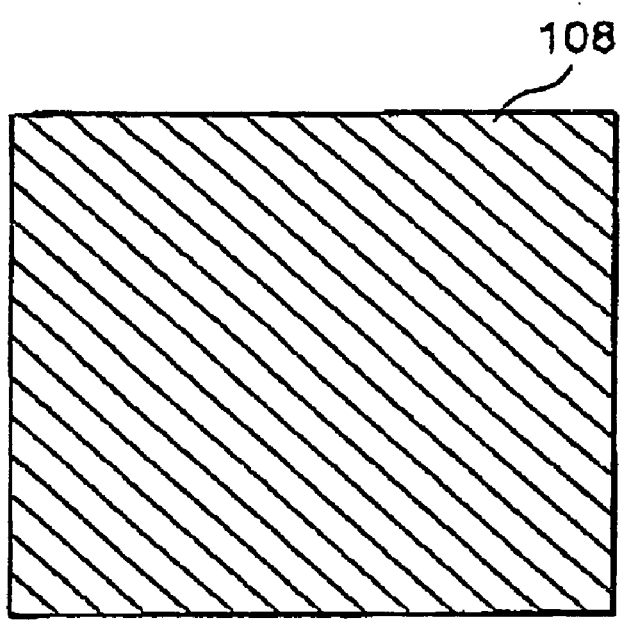
FIG. 4 shows a screen view cast by the conventional illumination system shown in FIGS. 2 and 3.
Figure 5:
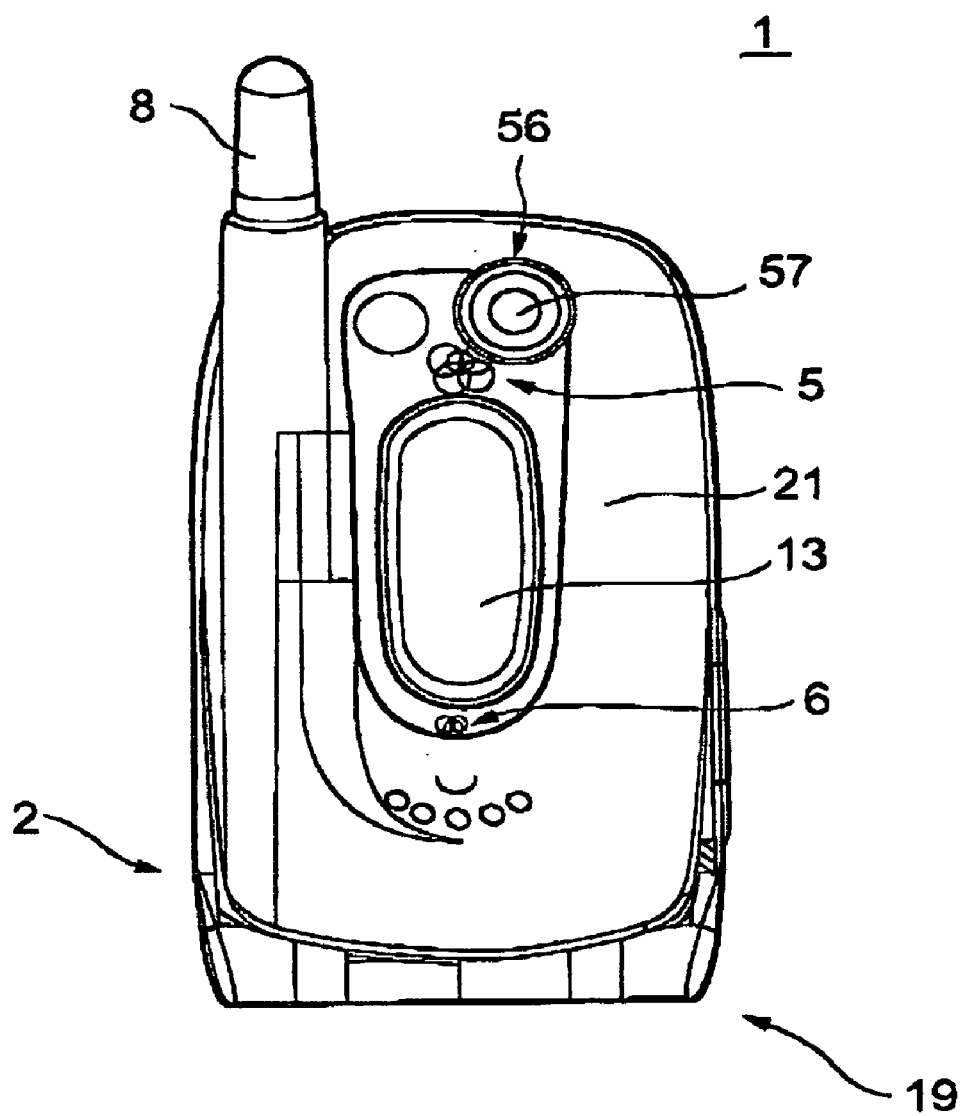
FIG. 5 shows a top view of a folding communication device with an illumination system of a first embodiment of the present invention when it is folded.
Figure 6:
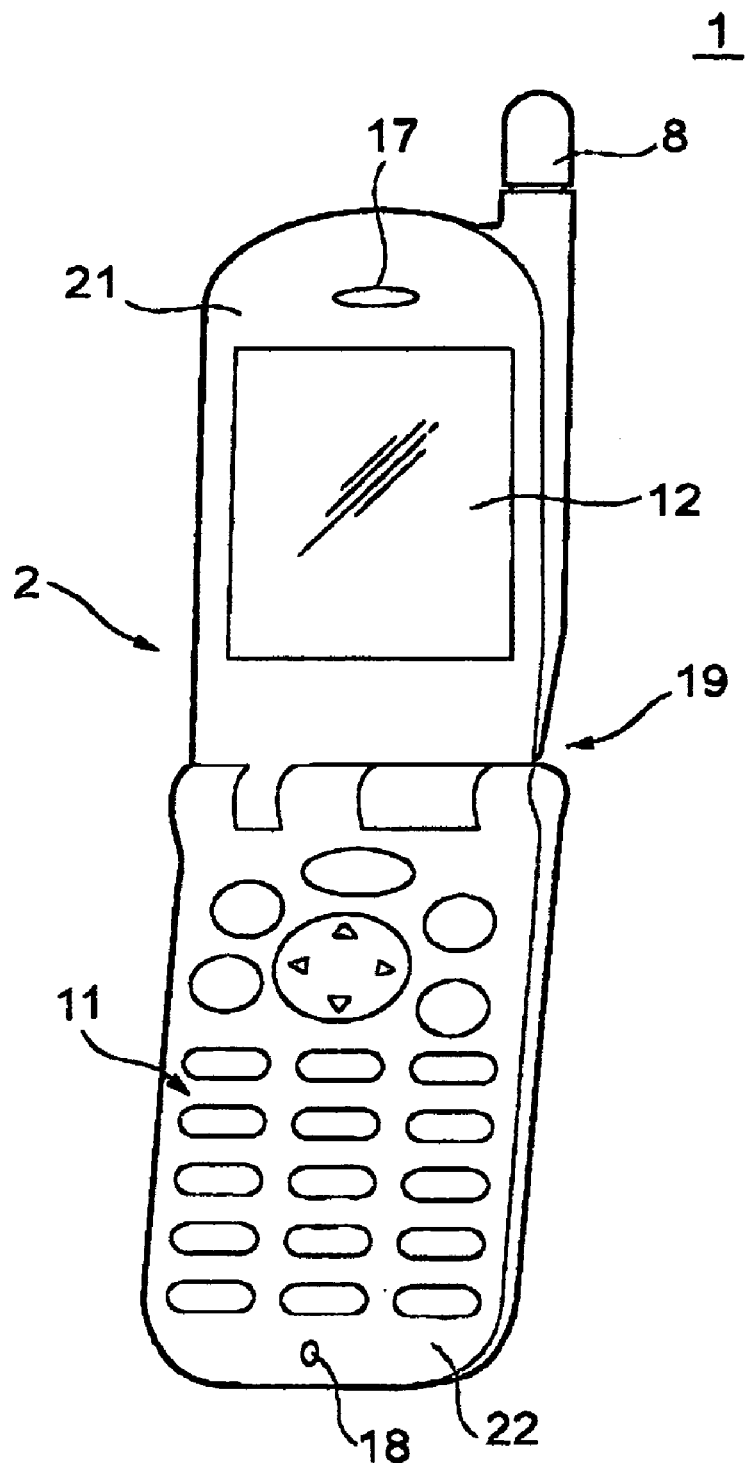
FIG. 6 shows a top view of the folding communication device shown in FIG. 5 with being unfolded.

Description will be made about a first embodiment of the present invention. The first embodiment is a portable communication device 1, e.g. a cellular telephone terminal. With reference to FIGS. 5 and 6, the portable communication device 1 has a foldable housing 2 which includes an upper housing 21 and a lower housing 22. The upper housing 21 and lower housing 22 are connected with each other via a hinge 19 and rotate on the hinge 19 to fold/unfold the foldable housing 2.

Figure 7:
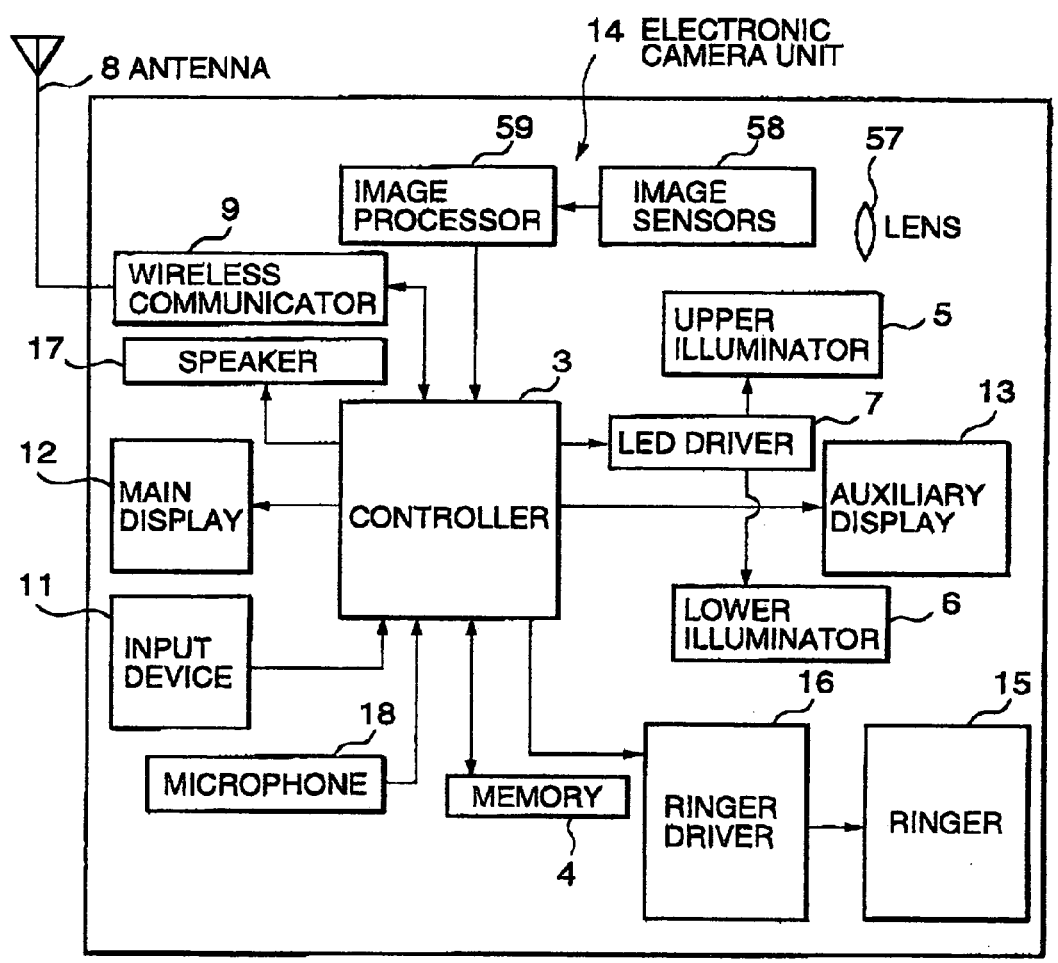
FIG. 7 shows a block diagram of the folding communication device shown in FIGS. 5 and 6.

As shown in FIG. 7, in the foldable housing 2, the portable communication device 1 includes a controller 3, a memory 4, an upper illuminator 5, a lower illuminator 6, a LED driver 7, an antenna 8, a wireless communicator 9, an input device 11, a main display 12, an auxiliary display 13, an electronic camera unit 14, a ringer 15, a ringer driver 16, a speaker 17, and a microphone 18.

The controller 3 includes a CPU (Central Processing Unit) which reads/writes the memory 4 and executes programs stored in the memory 4 to control other units of the portable communication device 1. For example, the following programs are executed on the controller 3: a communication control program for controlling communication procedures such as sending a call to a telephone number; a input control program for processing data input via key switches of the input device 11; an illumination control program for controlling the LED driver 17 to switch LEDs of the upper Illuminator 5 and/or the lower illuminator 6 in response to receiving a call and while establishing a connection between other communication device; a display control program for controlling the main display 12 and auxiliary display 13 to display image data (e.g. image data generated by the electronic camera unit 14); a web browser program for communicating with a web server and interpreting web page data; a mailer program for communicating with a mail server and managing mail data and so on.

The memory 4 stores program executed by the controller 3 and data read/written by the controller 3. The memory 4 consists of semiconductor memory and has a program storage area and a data storage area. The program storage area stores the above-mentioned programs. The data storage area stores data of configuration, communication log, address book, blinking pattern and so on. According to the blinking pattern information data, the upper and lower illuminators 5 and 6 are switched on/off. The data storage area further stores image data output from the electronic camera unit 14, register data and flag data for executing a program on the controller 3.

According to the illumination control program, in response to receiving a call or while establishing a connection, the controller 3 makes LEDs of the upper and lower illuminators 5 and 6 to blink with reference to the blinking pattern data.

The illumination control program states the procedure that, in response to receiving a call or while establishing a connection, the controller 3 makes the LEDs of the upper and lower illuminators 5 and 6 to blink with reference to the blinking pattern data. Although in this embodiment, the upper and lower illuminators 5 and 6 share a single blinking pattern data, in another embodiment, the illuminators may refer different blinking pattern data with each other.

The blinking pattern data are time series data. Each of the upper and lower illuminators 5 and 6 includes a red LED, a green LED and a blue LED. On-off states of three LEDs are expressed as a set of three bits data. For example, a first, second and third bit of the data set are related with on-off states of the red, green and blue LEDs, respectively. In this case, the data set (0,0,0) represents that all of the red, green and blue LEDs are off, the data set (0,0,1) represents that only the read LED is on; the data set (0,1,0) represents that only the green LED is on; the data set (1,0,0) represents that only the blue LED is on; the data set (1,0,1) represents that only the green LED is off; the data set (1,1,0) represents that only the red LED is off; the data set (0,1,1) represents that only the blue LED is off; and the data set (1,1,1) represents that all of the LEDs are on.

In this embodiment, the upper and lower illuminators 5 and 6 illuminate to inform of receiving a call and to decorate the portable communication device 1.

Figure 8:
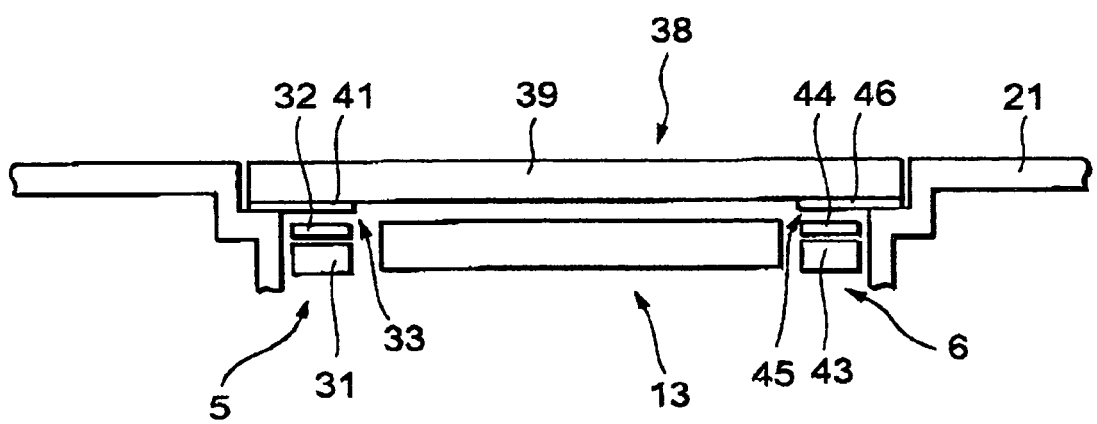
FIG. 8 shows a cross section diagram of a sub screen including the illumination systems of the first embodiment.
Figure 9:
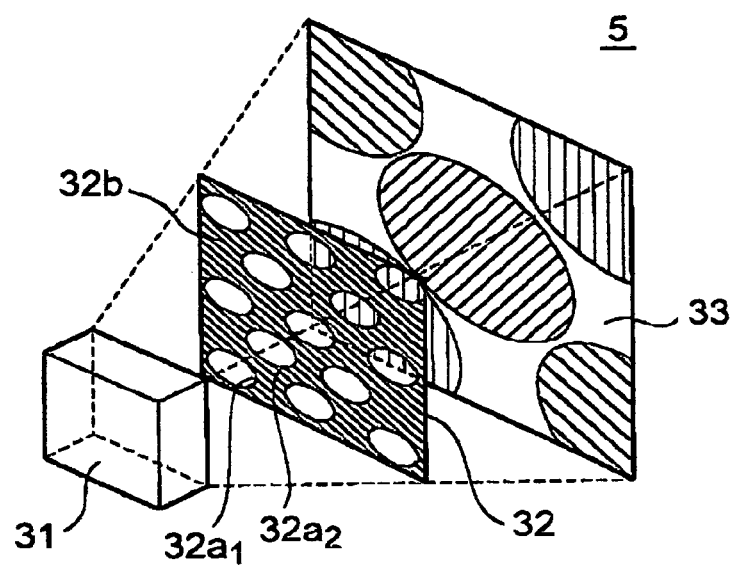
FIG. 9 shows a schematic diagram of the illumination system of the first embodiment.
Figure 10:
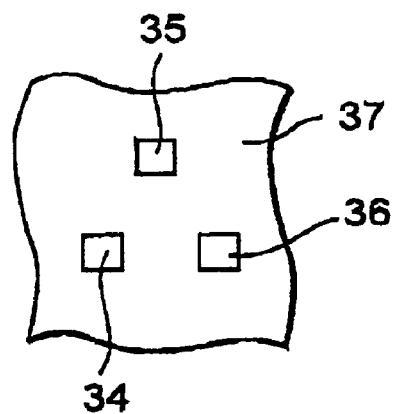
FIG. 10 shows an arrangement of three light emitting elements.

As shown in FIGS. 6 and 8, two illumination systems, or the upper and lower illuminators 5 and 6 are installed beside the upper and lower ends of the auxillary display 13, respectively. The upper illuminator 5 includes a light source unit 31, a conduit plate 32 and a screen 33, as shown in FIG. 9. Similarly, the lower illuminator 6 includes a light source unit 43, a conduit plate 44 and a screen 45, Hereinafter the description about the upper illuminator 5 is basically adaptive to that about the lower illuminator 6.

As shown in FIG. 9, the conduit plate 32 is inserted between the light source unit 31 and the screen 33. The conduit plate 32 has penetrable areas 32a1, 32a2, 32a3, . . . and opaque area 32b. The penetrable areas 32a1, 32a2, 32a3, . . . can transmit light and may be made of translucent or transparent material, or openings through the conduit plate 32. The opaque area 32b blocks the passage of light from the light source unit 31. Therefore, lights emitted from the light source unit 31 are cast on the screen 33 via the penetrable areas 32a1, 32a2, 32a3, . . . on the conduit plate 32.

In this embodiment, the penetrable areas are openings on the conduit plate 32. The conduit plate 32 is an opaque substrate, at least one of surfaces of which is covered with a opaque layer. The openings 32a1, 32a2, 32a3, . . . are formed predetermined positions on the opaque substrate.

The openings have an approximate circle form and are regularly formed on the substrate. In this embodiment, the diameter of the openings is about 0.5 mm, the pitch of the openings is about 1.0 mm.

Figure 12:
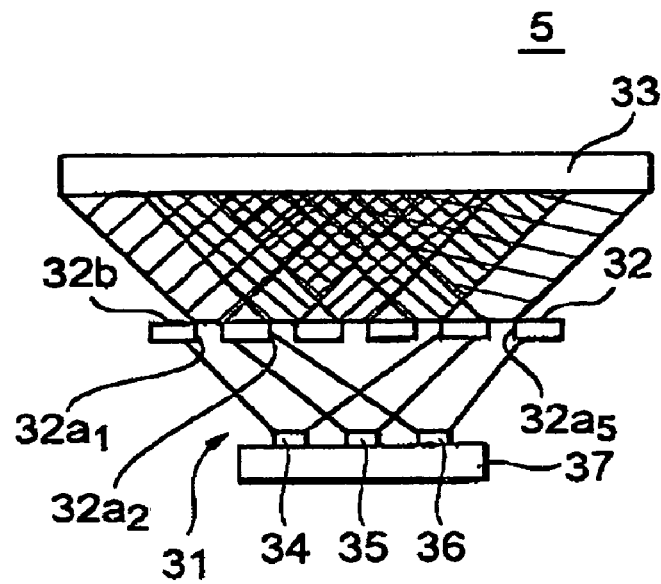
FIG. 12 shows a cross section diagram of the illumination system of the first embodiment.

As shown in FIG. 12, the light source unit 31 includes a red LED 34, a green LED 35 a blue LED 36 and a PCB (printed-circuit plate) 37. The LEDs 34, 35 and 36 are arranged on the PCB 37 in order that the centers of the LEDs 34, 35 and 36 form a triangle on the PCB 37. Each light rays from the LEDs 34, 35 and 36 travels through the holes 32a1, 32a2, 32a3, . . . to the screen.

Figure 11:
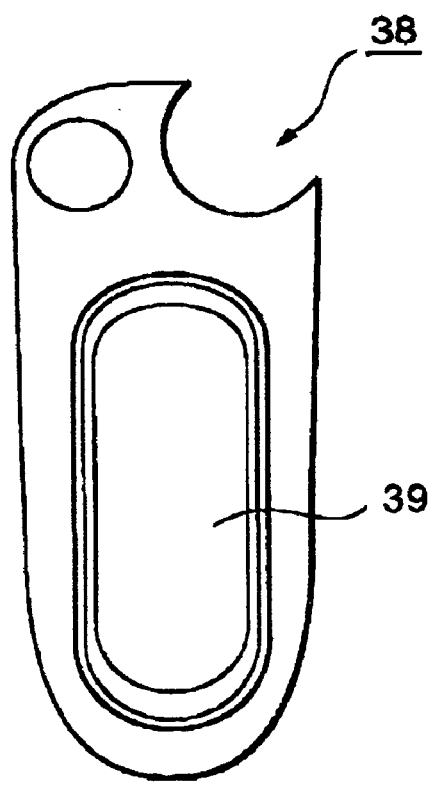
FIG. 11 shows an example of cover for covering a sub screen of the folding communication device.

With reference to FIGS. 8 and 11, the upper illuminator 5, the lower illuminator 6 and the auxiliary display 13 are covered with a cover 38, which is made of translucent material, except for a transparent window 39. Image displayed on the auxiliary display 13 is transmitted through the transparent window 39 toward its user's eyes. The screens 33 and 45 are formed on the inner surface of the cover 39 to oppose the light source units 31 and 43, respectively. The screen 33 has a white layer 41 for diffusing light from the light source unit 31. Similarly, the screen 45 has a white layer 46 for diffusing light from the light source unit 43.

The distance between the light source unit 31 and the conduit plate 32, the distance between the conduit plate 32 and the screen 33, the sizes, forms and arrangement of the penetrable areas 32a1, 32a2, . . . , and the arrangement of the red LED 34, the green LED 35 and the blue LED 36 on the PCB 37 are predetermined based on an illumination pattern to be displayed on the screen 33. For example, they are experimentally predetermined. The illumination pattern expresses arrangement of colors and temporal response of the arrangement on the screen 33. Namely, the illumination pattern may be change of patterns displayed on the screen 33, change of color arrangement in a pattern, and combination of these changes. The illumination pattern actually displayed on the screen 33 is eventually determined based on the blinking pattern of the LEDs. In this embodiment, the distance between the light source unit 31 and the conduit plate 32 is about 0.3 mm, and the distance between the conduit plate 32 and the screen 33 is about 1.0 mm.

The light emitted from the LEDs passes thorough routes described as following and as shown in FIG. 12.

The light rays emitted from the LEDs 34, 35 and 36 are first cast on the conduit plate 32, passes thorough the openings 32a1, 32a2, 32a3, 32a4 and 32a5 on the conduit plate 32, and then arrive on the screen 33.

The opening 32a1 is opened at a position on the conduit plate 32 where the light from the green LED 35 and the blue LED 36 seldom or never arrive. Therefore, the light passing through the opening 32a1 is almost red light. Similarly, the light passing through the opening 32a5 is almost blue light. Namely, the opening 32a1 mainly conducts red light and the opening 32a5 mainly conducts blue light Each of the rest openings 32a2, 32a3 and 32a4 conducts red, green and blue light. Therefore, the colors of the light rays through the openings 32a2, 32a3 and 32a4 are mixtures of red, green and blue, although the mixtures have a different mixing ratio of red, green and blue from each other.

The light rays through the openings 32a1, 32a2, 32a3, 32a4 and 32a5 are mixed between the conduit plate 32 and the screen 33 and then cast on the screen 33. In FIG. 12, red light is cast on the left end of the screen 33, blue light is cast on the right end of the screen 33, and between the left and right ends of the screen 33, mixed color light whose mixing ratio is dependent on a position on the screen 33 is cast on the screen 33.

As a result, red, green, blue spots of light are cast on the screen 33, spots having a mixed color of two or three of red, green and blue are cast on the screen 33, and in addition, these spots cast from openings on the conduit plate 32 are partly cast on a same area of the screen 33 with each other to make another color on the area.

Figure 13:
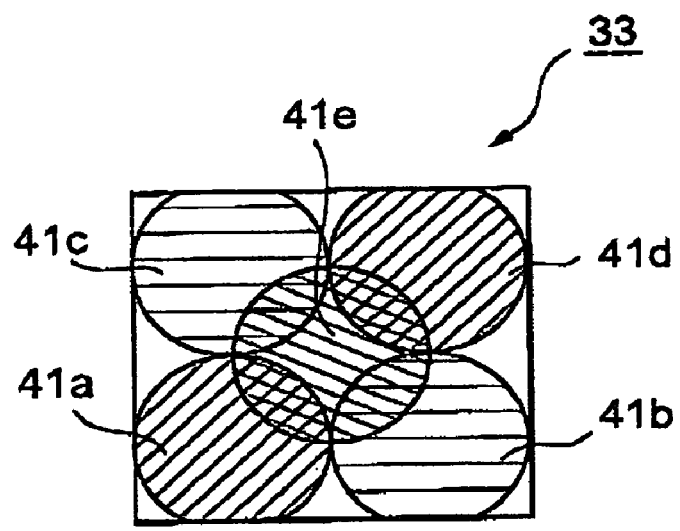
FIG. 13 shows a schematic diagram for use in describing the screen cast colored lights from the light emitting elements.
Figure 14:
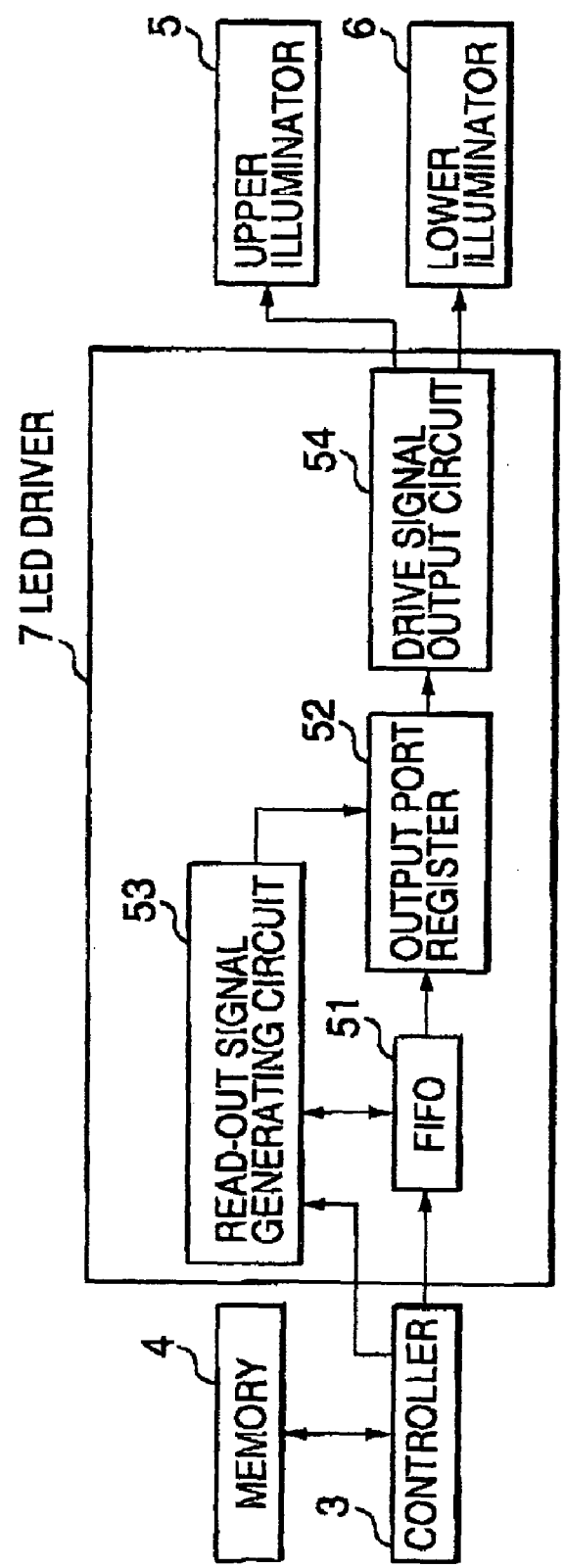
FIG. 14 shows a block diagram for use in describing an LED driver 7.

For example, as shown in FIG. 13, each of a primary color (red, green or blue) spot 41a, an yellow spot 41b, a magenta spot 41c, a cyan spot 41d and a white spot 41e is cast through an opening on the conduit plate 33. The yellow spot 41b is partly cast on the same area with the white spot 41e. As a result, the union of the spots 41b and 41e on the screen 33 has a different color from both yellow and white from the opening on the conduit plate 32. Similarly, mixture colors of the primary color and white, magenta and white and cyan and white appear on the screen 33.

The LED driver 14 includes a FIFO (First In First Out memory) 51, an output port register 52, a read-out signal generating circuit 53, and a drive signal output circuit 54. The FIFO 51 read blinking pattern data of the LEDs from the memory 4 and outputs in queue order. The output port register 52 stores output from the FIFO 51 and outputs to the drive signal output circuit 54. The read-out signal generating circuit 53 outputs a read-out signal to the FIFO 51 in accordance with a clock signal. The drive signal output circuit 54 outputs drive signal for driving the LEDs of the upper and lower illuminators 5 and 6.

The wireless communicator 9 includes a RF (radio frequency) circuit, a modulator/demodulator circuit, a base band circuit and so on. The wireless communicator 9 modulates sound or other data to radio waves, outputs the radio waves via the antenna 8, receives radio waves via the antenna 8, demodulates the radio waves to sound or data, establishes voice or data communication in accordance with predetermined protocols.

The input device 11 is a keypad for example including cursor keys for inputting a direction to move a cursor on the main display 12, numeric keys for inputting numbers, and function keys related to predetermined functions of the portable communication device 1. For example, function keys are browser key for executing a browser program on the portable communication device 1 to display web pages on the main display 12, an enter key for confirming user input, menu keys for displaying function menu of the portable communication device 1 on the main display 12, an input method switching key for switching input method, an address book key for displaying an address book on the main display 12, a clear key for erasing input or return state of the main display 12, a power key for turning on/off the portable communication device 1, and a camera key for activating the electronic camera unit 14 and for pressing the shutter of the camera unit 14.

The main display 12 is for example a transmissive LCD and is arranged on a front face of the upper housing 21 which is aligned with a front face of the lower housing 22 when the portable communication device 1 is folded. The main display 12 includes an LCD panel, a backlight, and a driver circuit.

The LCD panel is for example a transmissive liquid crystal display panel with TFT (Thin Film Transistor) structure, which includes a TFT substrate embedded TFTs and transparent pixel electrodes, an opposite substrate which includes a color filer and opposes to the TFT substrate with several-micrometer-gap, and a pair of polarizes arranged outside of the substrates.

The auxiliary display 13 is for example a transmissive LCD panel and is arranged on a back face of the upper housing 21, which displays time, arrival of calling, receiving a mail etc. when the portable communication device 1 is folded.

As shown in FIGS. 5 and 7, the electronic camera unit 14 includes a hole 56, a lens 57, image sensors 58 and an image processor 59. The hole 56 is arranged on the back face of the upper housing 21 to guide the light coming from objects to the lens 57. The lens 57 is arranged in the hole 56, is for example a standard lens and focuses on the image sensors 58. The image sensors 58 are for example CCD (Charge Coupled Devices) and transform photon flux thorough the lens 57 into a charge. The image processor 59 performs analog to digital translation to translate from analog image signals output by the image sensors 58 to digital image signals and applies gamma correction, color space conversion and/or other image processing to the digital image signals.

Next, description will be made about the operation of the portable communication device 1.

After turning the portable communication device 1 on, the controller 3 enters a waiting mode for standing by for inputting via the input device 11 or receiving a call from another communication device, and displays on the main display 12 that the portable communication device 1 is in the waiting mode.

When the device 1 is in the waiting mode, in response to inputting via the device 1 or receiving a call, the controller 3 controls the LED driver 7 to blink the red, green and blue LEDs 34, 35 36 of the light source unit 107 according to a predetermined blinking pattern data. As a result, a desired illumination pattern corresponding to the blinking pattern data is performed on the screens 33 and 45.

Figure 15:
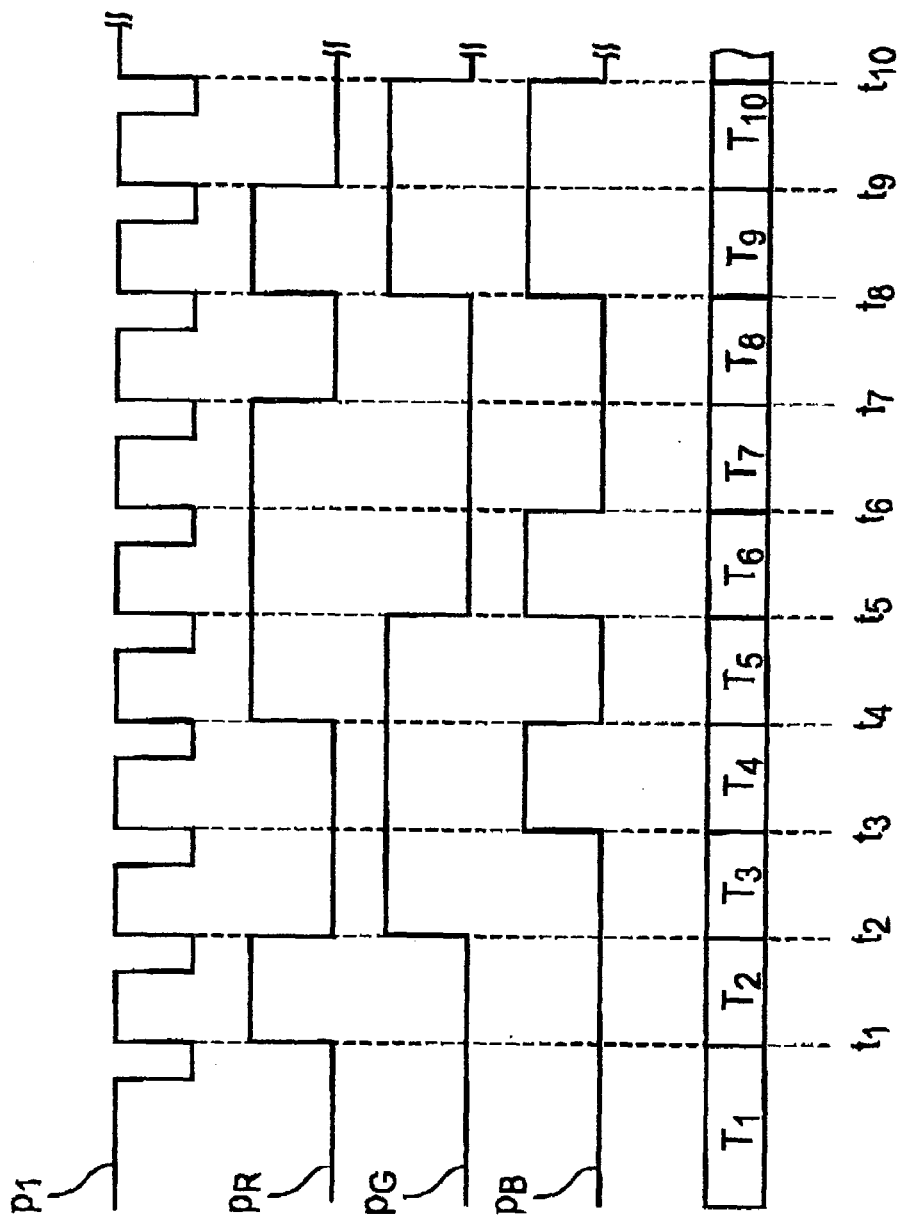
FIG. 15 shows a timing chart for use in describing switching of the light emitting elements.

Namely, the controller 3 reads the blinking pattern data from the memory 4 and writes it to the FIFO 51. Then, as shown in FIG. 15, the read-out signal generating circuit 53 generates a read-out signal P1 according to a clock signal. The circuit 53 starts this signal generation in response to a start signal that is output from the controller 3.

In response to the read-out signal P1, the FIFO 51 writes the blinking pattern data to the output port register 52. The output port register 52 outputs port output signals PR, PG and PB for driving the red, green and blue LEDs respectively. The drive signal output circuit 54 drives the LEDs according to the port output signals PR, PG and PB.

As described above, the FIFO 51 sequentially outputs the blinking pattern data to the output port register 52 and then the amount of the data that remains in the FIFO 51 reduces. When the remaining data becomes a predetermined amount, the FIFO 51 requests the controller 3 to provide additional data. In response to the request, according to the amount of the free space in the FIFO 51, the controller 3 reads the following blinking pattern data from the memory 4 and then sets the data to the FIFO 51.

As shown in FIG. 15, before the time instant t1 at which the controller 3 detects receiving a call, namely in a unit time period T1 (t|t1), all of the port output signals PR, PG and PB are low or L. In this time period, the red, green and blue LEDs 34, 35 and 36 are all off and consequently, no color is cast on the screens.

Next, in a time period T2 (t1|t|t2), the port output signals PR, PG and PB are H, L and L, respectively and only the red LED 34 emits to cast red light on the screen.

Similarly: in a unit time period T3 (t2|t|t3), only the port output signal PG is H; in a unit time period T4 (t3|t|t4), only the signal PR is L; in a period T5 (t4|t|t5), only the signal PB is L; in a period T6 (t5|t|t6), only the signal PG is L; in a period T7 (t6|t|t7), only the signal PR Is H; in a period T8 (t7|t|t8), all of the signals PR, PG and PB are L; in a period T9 (t8|t|t9), all of the signals PR, PG and PB are H; and; in a unit time period T10 (t9|t|t10), only the port output signal PR is L.

In the periods T4, T5, T6, T9 and T10, two or three LEDs emit at once and two or three color light rays are cast on the conduit plate 32. Some colors are mixed through the conduit plate 32 and then original colors emitted by the LEDs and the mixture colors are cast on the screen 33. For example, in the period T9, red, green and blue are mixed through the conduit plates 32 to produce white. Two of red, green and blue are mixed through the conduit plates 32 to produce yellow, magenta or cyan. On the screen 33, two of red, green, blue, white, yellow, magenta and cyan are mixed to produce another color.

Figure 16A:
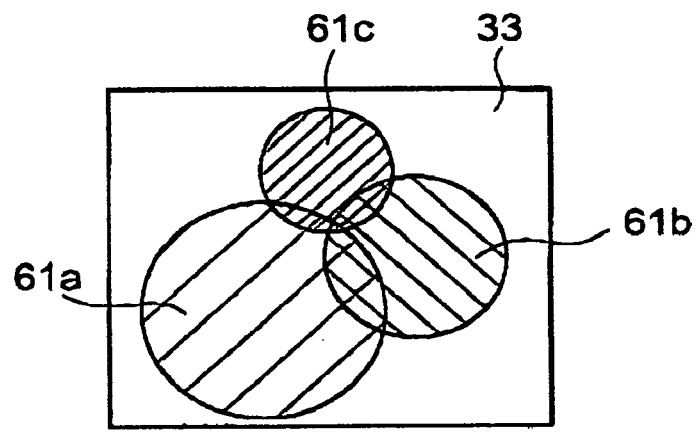
FIG. 16A shows a schematic diagram for use in describing movement of light spots on the screen.
Figure 16B:
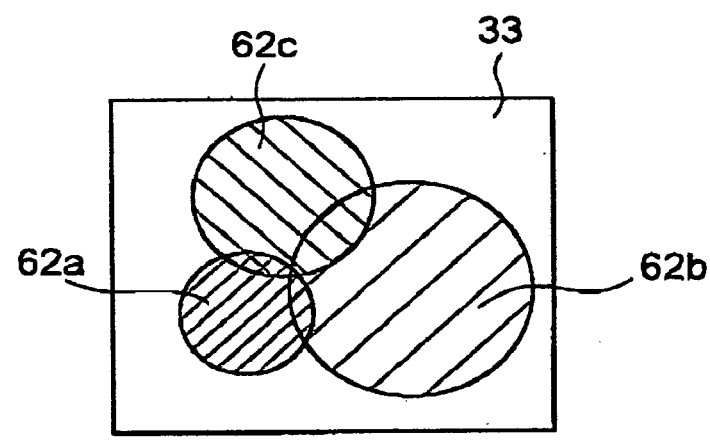
FIG. 16B shows a schematic diagram for use in describing movement of light spots on the screen.
Figure 16C:
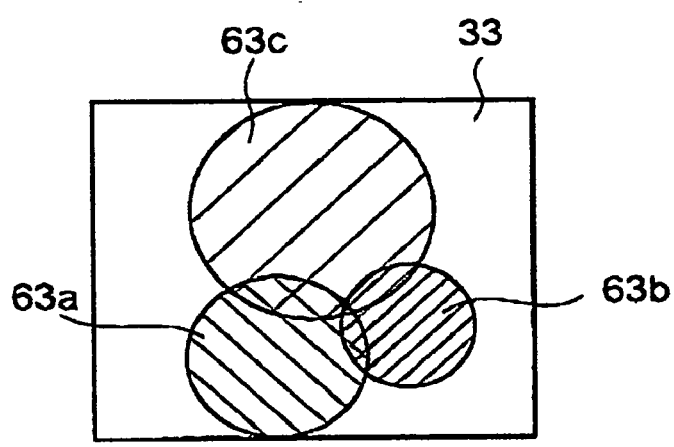
FIG. 16C shows a schematic diagram for use in describing movement of light spots on the screen.

For example, illumination pattern appears on the screens 33 and 45 as shown in FIGS. 16A, 16B and 16C, that show illumination patterns displayed on the screen 33 in a series of three time periods.

In FIG. 16A, three spotlights 61a, 61b and 61c are cast on an area of the screen 33 for a first unit time period. The sizes and colors of the spotlights 61a, 61b and 61c are different from each other. Colors of the spotlights are three of red, green, blue, white, yellow, magenta and cyan. Additionally, two or three of the spotlights partially overlap and as a result another color is produced.

In a second period, as shown in FIG. 16B, three spotlights 62a, 62b and 62c are cast on the area. The sizes and colors of the spotlights 62a, 62b and 62c are different from each other. The colors of the spotlights 62a, 62b and 62c are the same as those of the spotlights 61a, 61b and 61c respectively. The centers of the spotlights 62a, 62b and 62c are on substantially the same position as those of the spotlights 61a, 61b and 61c respectively. The sizes of the spotlights 62a, 62b and 62c are substantially the same as those of the spotlights 61c, 61a and 61b respectively.

In a third period, as shown in FIG. 16c, three spotlights 63a, 63b and 63c are cast on the area. The sizes and colors of the spotlights 63a, 63b and 63c are different from each other. The colors of the spotlights 63a, 63b and 63c are the same as those of the spotlights 62a, 62b and 62c respectively. The centers of the spotlights 63a, 63b and 63c are on substantially the same position as those of the spotlights 62a, 62b and 62c respectively. The sizes of the spotlights 63a, 63b and 63c are substantially the same as those of the spotlights 62a, 62b and 62c respectively.

The size of a spot on the screen caused by a light ray from a LED depends on the distance between the LED and the hole through which the light ray is cast on the screen. If the source LED is closer to the hole, then the spot is larger. Therefore, the sizes and positions of spots on the screen change in response to blinking of the red, green and blue LEDs 34, 35 and 36. As a result, movements of spotlights are displayed on the screen.

With reference to FIG. 16A, 16B and FIG. 16C, the spot 61a seems to move to the spot 62b and then to move to the spot 63c. The spot 61b seems to move to the spot 62c and then to move the spot 63a. The spot 61c seems to move to the spot 62a and then to move to the spot 63b. Namely, the spots seem to revolve in the screen. Further, color of an area of the screen seems to change.

Figure 17:
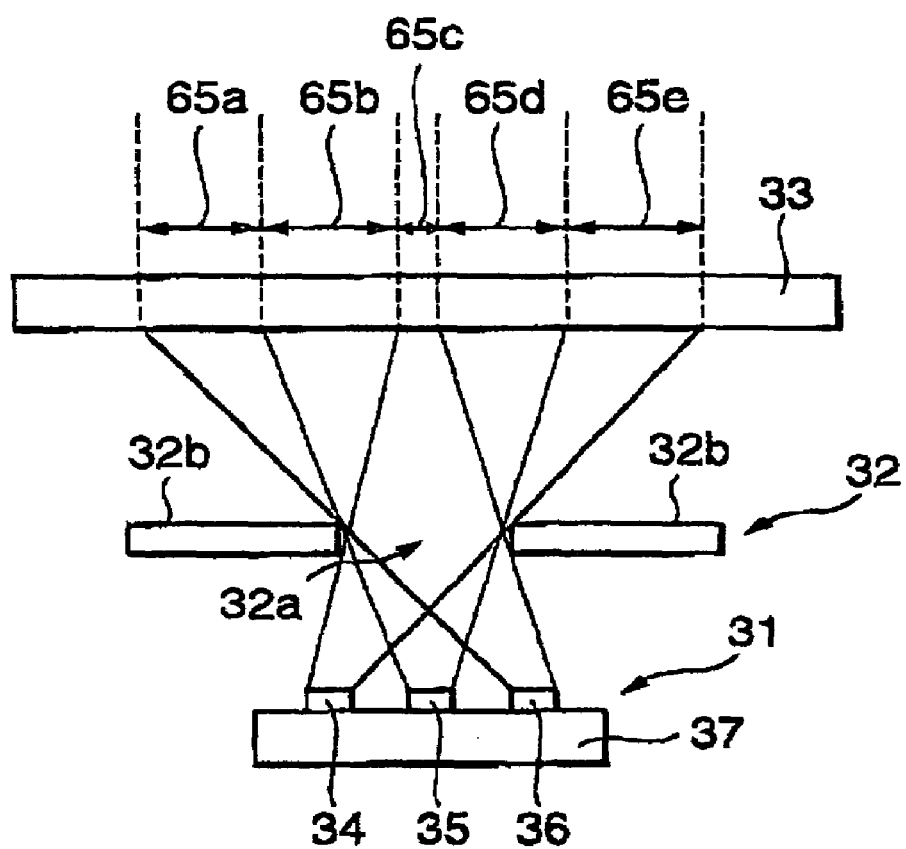
FIG. 17 shows a schematic cross section diagram of the illumination system of the first embodiment.

Herein, the structure of the upper Illuminator 5 will be described in detail. As shown in FIG. 17, it is assumed that relatively large penetrable area 32a is installed at the center of the conduit plate 32 and the distance between the red LED 34 and the blue LED 36 is longer than that between the other combinations of the LEDs.

In the time period T9 of FIG. 15, namely when all of the LEDs are on, each of red, green and blue rays is cast through the penetrable area 32a on the screen 33.

On the screen 33: an area 65a mainly receives blue light; an area 65b mainly receives blue and green light to produce cyan; an area 65c receives red, green and blue light to produce white; an area 65d mainly receives red and green light to produce yellow; and an area 65e mainly receives red light. Blue, cyan, white, yellow and red are displayed on the area 65a, 65b, 65c, 65: and 65e respectively. As a result, the screen 33 displays plural colors at once. It is noted that, in conventional techniques, there Is no conduit plate 32 between the light source 37 and the screen 33 so that all areas on the screen only displays white.

Figure 18A:
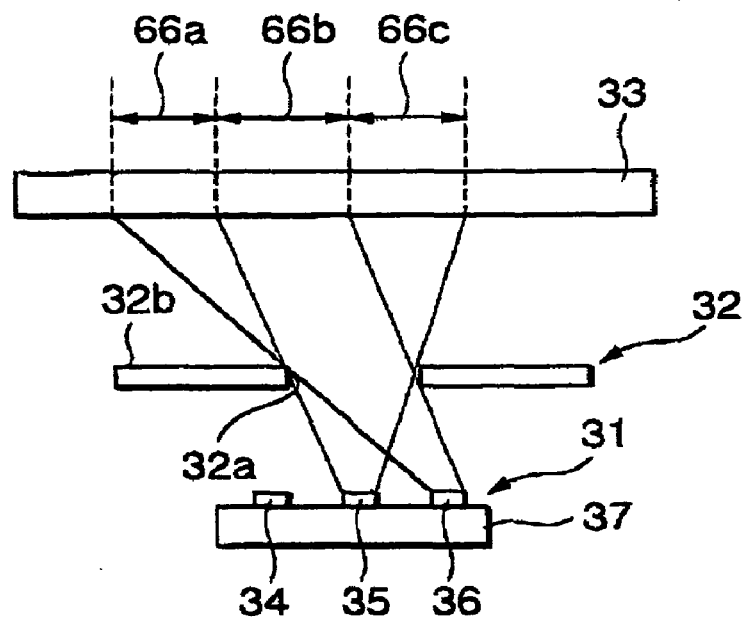
FIG. 18A shows a schematic cross section diagram for use in describing movement of light spots on the screen.
Figure 18B:
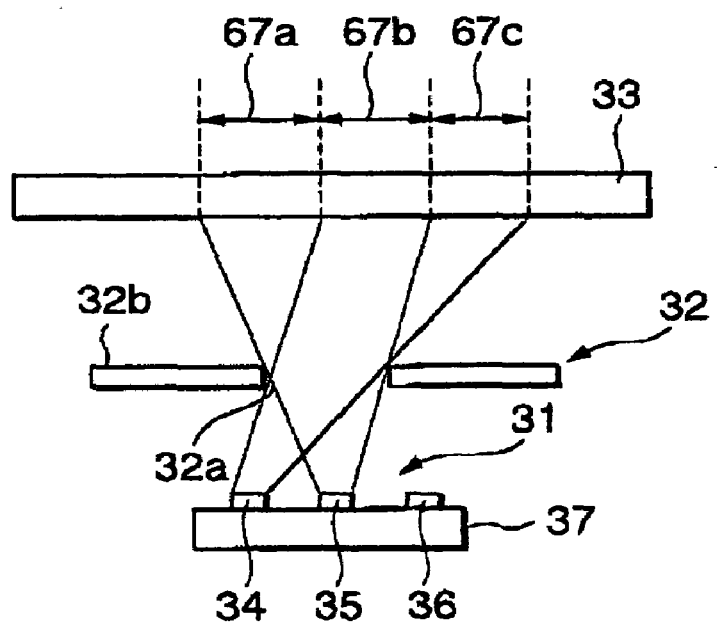
FIG. 18B shows a schematic cross section diagram for use in describing movement of light spots on the screen.

From the period T4 to T5, the screen 33 displays as shown in FIG. 18A and 18B. In the period T4, the green and blue LEDs 35 and 36 emit to display a blue area 66a, a cyan area 66b and a green area 66c on the screen 33. Then, in the period T5, the red and green LEDs 34 and 35 emit to display a green area 67a, a yellow area 67b and a red area 67c on the screen 33. As a result, spots on the screen 33 seem to move from the areas 66a, 66b and 66c to 67a, 67b and 67c with changing their colors.

As described above, spots on the screen 33 are displayed as if they move around on the screen 33 with changing their colors. Similarly to the upper illuminator 5, the lower illuminator 6 operates to display spots on the screen 46. In this embodiment, the controller 3 makes the LED driver 7 blink the red, green and blue LEDs 34, 35 and 36 to display Illumination pattern on the screens 33 and 45, not only when the portable communication device 1 receives a call, but also while the portable communication device 1 is establishing a connection to another communication device.

According to this embodiment, the LEDs emit colors that are different from each other and cast all of the colors on the screen at once. Compared with this embodiment, according to a conventional system, even if the system includes plural LEDs that emit different colors from each other, only a single color is cast on the screen at once.

According to this embodiment, colors are cast through a penetrable area on the conduit plate, and then the colors partially overlap with each other on the screen to produce other colors. Therefore, the number of colors displayed on the screen at once further increases.

According to the embodiment, each of the LEDs blinks in accordance with a different blinking pattern. A blinking pattern of a LED Is independent on that of another LED. In this embodiment, three LEDs are installed and consequently, one of $2^3=8$ patterns is available for being displayed at one time period on the screen. Moreover, in case of defining a series of ten patterns as an illumination pattern, the number of illumination patterns is $8^{10}=1073741824$. A lot of illumination patters each of which may include combinations of plural colors are available for displaying on the screen.

According to this embodiment, although both the LEDs and the conduit plate are fixed, color spots on the screen are displayed as if the spots revolve around with changing their colors. Therefore, the illumination system improves visual amusement of the portable communication device 1.

The sizes of spots displayed on the screen are different from each other. This difference supplies perspective to the screen. Therefore, in spite of its simple structure, the illumination system of this embodiment provides perspective decoration on the screen.

As mentioned above, according to this embodiment, the appearance and amusement of the portable communication device 1 are improved. This improvement depends on the conduit plate between the LEDs and the screen. All of these are fixed elements. Therefore, the Illumination system can be installed into a device without preventing miniaturization, weight saving, reducing the thickness and cost of the device.

Figure 19:
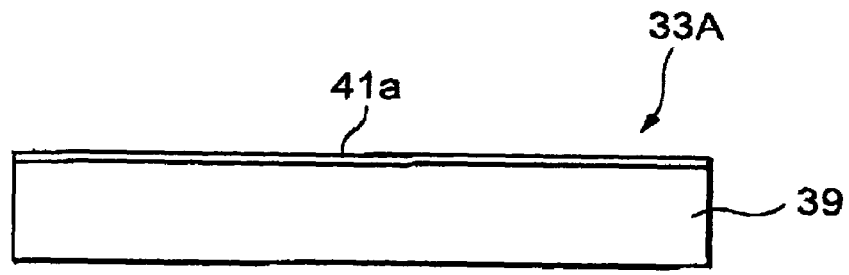
FIG. 19 shows a cross section diagram of a screen of a second embodiment of the present invention.

Description will be made about a second embodiment of the present invention with reference to FIG. 19. Compared to the illumination system of the first embodiment, a screen 33A of the second embodiment corresponding to the screen 33 has another structure. The screen 33A includes a transparent plate 39 and a white layer 41a that covers the exit surface of the transparent plate 39. The incoming surface of the transparent plate 39 faces the light source unit 31 and the exit surface of the transparent plate 39 faces outside of the portable communication device 1.

In an illumination system including a screen with a white layer on its incoming surface of a transparent plate, light rays focus Images on the white layer and do not travel thorough the transparent plate. On the other hand, in the illumination system including the screen 33A, light rays travel through the transparent plate 39 and then focus on the white layer 33A. Therefore, the screen 33A displays larger images and their movement on the white layer 41a than the screen including the white layer on the incoming surface does. As a result, more dynamic movement of spots is displayed on the screen 33A than on the screen 33.

Figure 20:
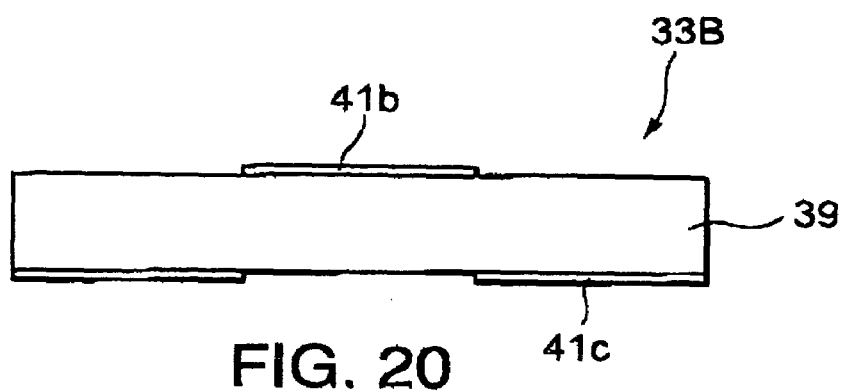
FIG. 20 shows a cross section diagram of a screen of a third embodiment of the present invention.
Figure 21:
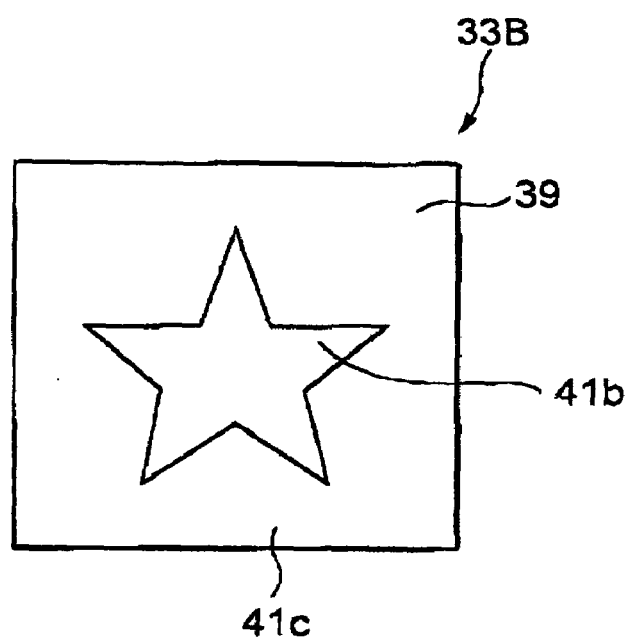
FIG. 21 shows a top view of the screen of the third embodiment.

Description will be made about a third embodiment of the present invention. According to the third embodiment, the illumination system includes a screen 33B as shown in FIGS. 20 and 21. The screen 33B includes, as shown in FIG. 20, a transparent plate 39, a white layer 41b on the exit surface of the plate 39 and another white layer 41c on the Incoming surface of the plate 39. The white layers 41b and 41c have outlines and are arranged so as not to overlap with each other, or so that light rays are cast on one of the white layer 41b and 41c. For example, in case of FIG. 21, the white layer 41b Is star-shaped and the white layer 41c has a star-shaped hole, which corresponds to the shape of the white layer 41b, at its center.

According to this embodiment, since there is a light path difference between the white layers 41b and 41c, stereoscopic effect is provided. Further, a desired shape, in this embodiment a star-shape is desired, can be illuminated on the white layer 41b.

While this invention has thus far been described in conjunction with a few embodiments thereof, it will be readily possible for those skilled in the art to put the this invention into various other manners.

Although the illumination system is installed in order for example to inform of receiving a call, it may be installed to light up key buttons of the portable communication device 1.

In the embodiments mentioned above, in response both to receiving a call and to establishing a connection, the illumination system works according to a single illumination pattern. However, different illumination patterns may be applied.

In the embodiments mentioned above, the upper and lower illuminators 5 and 6 synchronously blinks according to the same blinking pattern. However, each of the upper and lower illuminators 5 and 6 may asynchronously blink according to a single blinking pattern, may synchronously blink a different blinking pattern from each other, or may independently blink according to a different blinking pattern.

The number of illuminators is not necessarily 2. The number may be one or more than 3.

In the embodiments the red, green and blue LEDs are arranged in a triangle. However, the LEDs may be arranged in a single line.

The numbers of the red, green and blue LEDs may be not only one but also more than two. The numbers may be different from each other. For example, the numbers of the red, green and blue LEDs may be one, two and three, respectively.

In the embodiments, the combination of colors of the LEDs is red, green and blue to constitute an additive color system. However, according to the present invention, color combination of the LEDs are not restricted to an additive color system. For example, a combination of orange, yellow and yellowish green LEDs may compose the light source unit. Further, a white LED may be added to the combinations.

Figure 22:
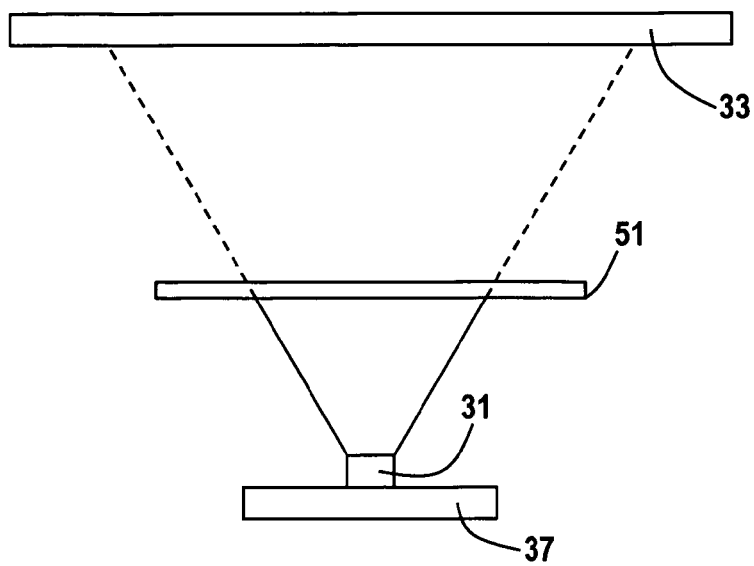
FIG. 22 shows a schematic cross-section diagram of the illumination system of the fourth embodiment.

A combination of cyan, magenta and yellow lights may be emitted from the light source unit. These emissions may be made by a combination of cyan, magenta and yellow LEDs to constitute an additive secondary color system. A color of the additive secondary color system may be emitted from a combination of a LED which emits a color of an additive color system and a fluorescent plate which emits another color of the additive color system. Alternatively, as shown in FIG. 22, a color of the additive secondary color system may be emitted from a combination of a white LED 50 and a color filter 51.

In the embodiments, the LEDs are just switched between ON and OFF and their emission intensities are not variable. However, according to the present invention, the emission intensities may be variable to change the amount of light through the penetrable area. In this case, the illumination system can provide richer expressiveness than the illumination system mentioned above can.

In the embodiments, the auxiliary display is a LCD. However, the auxiliary display may be composed of LEDs. Further, when the auxiliary display is composed of LEDs, they may include the LEDs of the upper and lower illuminations.

In the embodiment, the blinking pattern is fixed. However, the blinking pattern may be settable by the operator of the portable communication device. In this case, the operator previously sets a desired blinking pattern to the memory 4. The controller 3 accesses the memory 4 to read the setting of the blinking pattern and orders the LED driver 7 to drive the LEDs of the upper and lower illuminators 5 and 6 according to the blinking pattern. In this case, the present invention can provide fun to adjust a blinking pattern to the operator of the portable communication device.

Each of the penetrable areas on the conduit plate may have any shape. For example, a penetrable area may be a circle, triangle, rectangle, star-shaped, or even Indeterminate form. Further, the penetrable areas may be arranged in any formation. For example, the penetrable areas are arranged in a grid, radiation spiral or irregular pattern. The conduit plate may be composed of a net member woven from line members In a grid pattern, or of a pectinate member woven from line members that are arranged in parallel with each other.

Although in the embodiments the illumination system includes a single conduit plate, the illumination system of the present invention may include plural conduit plates. In this case, penetrable areas on one conduit plate may be or not be arranged at the same positions where penetrable areas on other conduit plate are arranged.

A transparent plate on which a black layer is formed as opaque areas may be used as the conduit plate. For example, the black layer may be printed on the transparent plate to form opaque areas.

Instead of a white layer on the screen, a diffusion layer may be formed on the screen. The surface of the diffusion layer is unevenness in order to diffuse incoming light and is for example a satin finished surface or a wrinkle surface.

Figure 23:
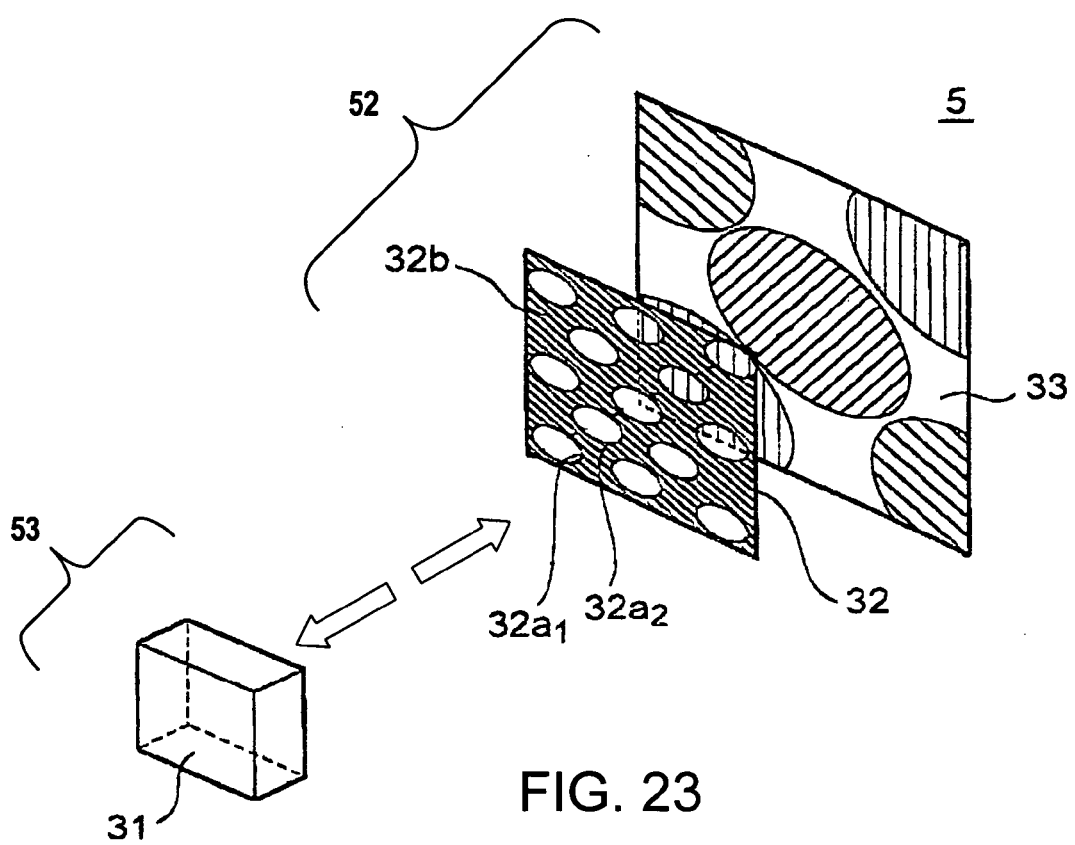
FIG. 23 shows a schematic diagram of the illumination system of the fifth embodiment.

The conduit plate 32 and screen 33 as illustrated in FIG. 23 and represented by reference no. 52, may be detachable from the illumination system 53 included the light source unit 31. At least one of the conduit plate and the screen may be adjustable to adjust the space between them.

In the abovementioned embodiments, the conduit plate, screen and white layer are flat. Instead, they may be domed.

Figure 24:
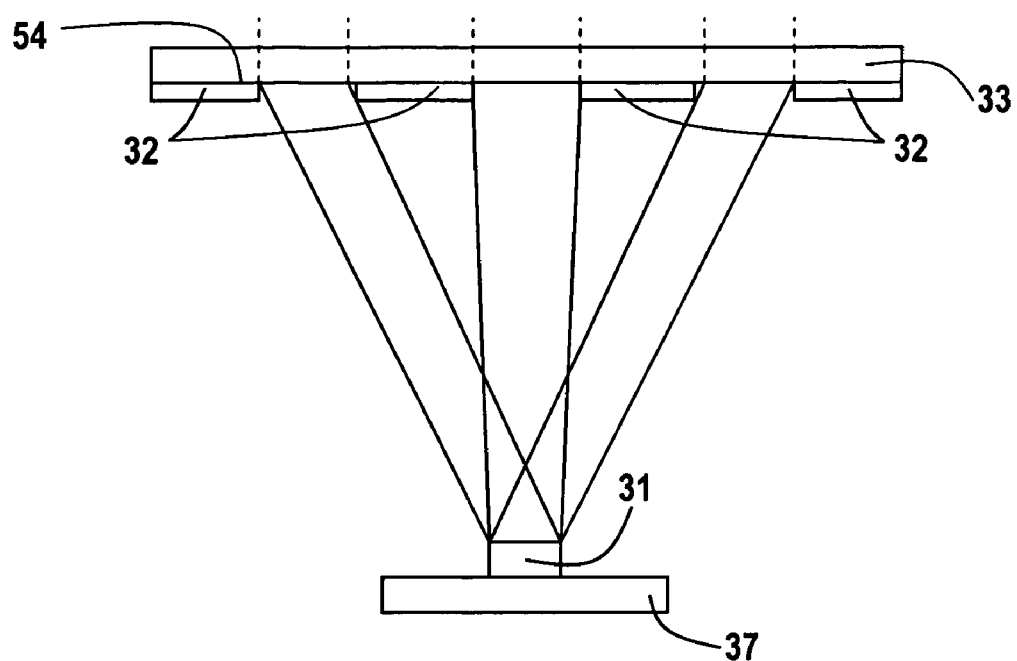
FIG. 24 shows a schematic cross-section diagram of the illumination system of the sixth embodiment.

The conduit plate 32 may be integrated with the lower surface 54 of the screen 33 as shown in FIG. 24.

Inside of the upper housing 21 covering the upper and lower Illuminators may be painted white or silver.

In the third embodiment, a single star-shaped white layer 41b is formed on the center of the transparent plate 39. However, plural shapes may be formed on the transparent plate 39. The plural shapes may be arranged in for example concentric circles, stripes or a checkerboard pattern.

What is claimed is:

1. An illumination system for a portable communication device comprising:
    light source elements including at least a first element for emitting a first color light and a second element for emitting a second color light whose color is different from the first color light, said light source elements emitting different colored lights based on a status of said portable communication device;
    a screen for projecting the first and second color lights from the light source elements; and
    a plate disposed between the light source elements and the screen, and comprising first areas and second areas, the first and second areas having different properties of conducting light from each other,
    wherein the first color light projects through the plate on a first portion of the screen,
    wherein the second color light projects through the plate on a second portion of the screen, and
    wherein the first and second portions overlap with each other.

2. The illumination system claimed in claim 1, wherein the light source elements are arranged in line with each other.

3. The illumination system claimed in claim 1, wherein the light source elements are arranged in vertexes of a polygon.

4. The illumination system claimed in claim 1, wherein the light axes of the light source elements are parallel but offset from each other.

5. The illumination system claimed in claim 1, wherein the first areas of the plate are openings opened through the plate.

6. The illumination system claimed in claim 1, wherein the arrangement of the first and second areas on the plate causes a design to be projected on the screen.

7. The illumination system claimed in claim 1, wherein:
    the plate comprises a transparent or translucent plate; and
    the plate comprises partially painted areas with lightproof paint as the second areas.

8. The illumination system claimed in claim 1, wherein the plate comprises an opaque plate with penetrable areas for conducting light.

9. The illumination system claimed in claim 8, wherein the penetrable areas are openings opened through the plate.

10. The illumination system claimed in claim 8, wherein the penetrable areas comprise transparent members fit into the plate.

11. The illumination system claimed in claim 1, wherein the light source elements comprise dots emitting light.

12. The illumination system claimed in claim 1, wherein the light source elements comprise red, green and blue light source elements for emitting red, green and blue light, respectively.

13. The illumination system claimed in claim 1, wherein the light source elements comprise cyan, magenta and yellow light source elements for emitting cyan, magenta and yellow light, respectively.

14. The illumination system claimed in claim 12, wherein light emitted from one of the red, green and blue light source elements is partially mixed with a part of light emitted from the other.

15. The illumination system claimed in claim 13, wherein light emitted from one of the cyan, magenta and yellow light source elements is partially mixed with a part of light emitted from the other.

16. The illumination system claimed in claim 1, wherein each of the light source elements blinks according to a predetermined blinking pattern.

17. The illumination system claimed in claim 16, wherein the blinking pattern is predetermined according to a shape of at least one of the first and second area and to the arrangement of the first and second areas on the plate.

18. The illumination system claimed in claim 16, wherein the blinking pattern is predetermined according to the arrangement of the plate, the light source elements and the screen.

19. The illumination system claimed in claim 16, wherein the blinking pattern is predetermined according to the arrangement of the light source elements.

20. The illumination system claimed in claim 1, wherein at least one filter member is disposed between the plate and the light source elements or between the plate and the screen.

21. The illumination system claimed in claim 1, wherein at least one of the plate and the screen is detachable from the illumination system.

22. The illumination system claimed in claim 1, wherein the plate and the screen are integrated with each other.

23. The illumination system claimed in claim 1, wherein:
    the screen comprises a transparent or translucent plate with a diffusion layer on at least one surface of the plate; and
    the diffusion layer diffuses light from the light source elements.

24. The illumination system claimed in claim 23, wherein the diffusion layer comprises a white layer.

25. The illumination system claimed in claim 23, wherein:
    the diffusion layer being formed on a part of a surface of the plate; and
    the diffusion layer and the rest of the surface project a design to be illuminated with the light from the light source elements.

26. The illumination system claimed in claim 1, wherein said illumination system is integral with an electronic device.

27. A portable communication device comprising the illumination system claimed in claim 1, comprising:
    an illumination controller for controlling said light source elements based on said status of said portable communication device.

28. The portable communication device claimed in claim 27, wherein the illumination system is activated in response to a predetermined operation of the portable communication device.

* * * * *